(No Model.) 6 Sheets—Sheet 1.

F. W. LEINBACH, C. A. WOLLE & E. H. BRUNNER.
PAPER BAG MACHINE.

No. 269,434. Patented Dec. 19, 1882.

Witnesses:
Harry Drury
Harry Smith

Inventors
F. W. Leinbach, C. A. Wolle
and E. H. Brunner
by their Attorneys
Howson and Sons (No Model.) 6 Sheets—Sheet 2.

F. W. LEINBACH, C. A. WOLLE & E. H. BRUNNER.
PAPER BAG MACHINE.

No. 269,434. Patented Dec. 19, 1882.

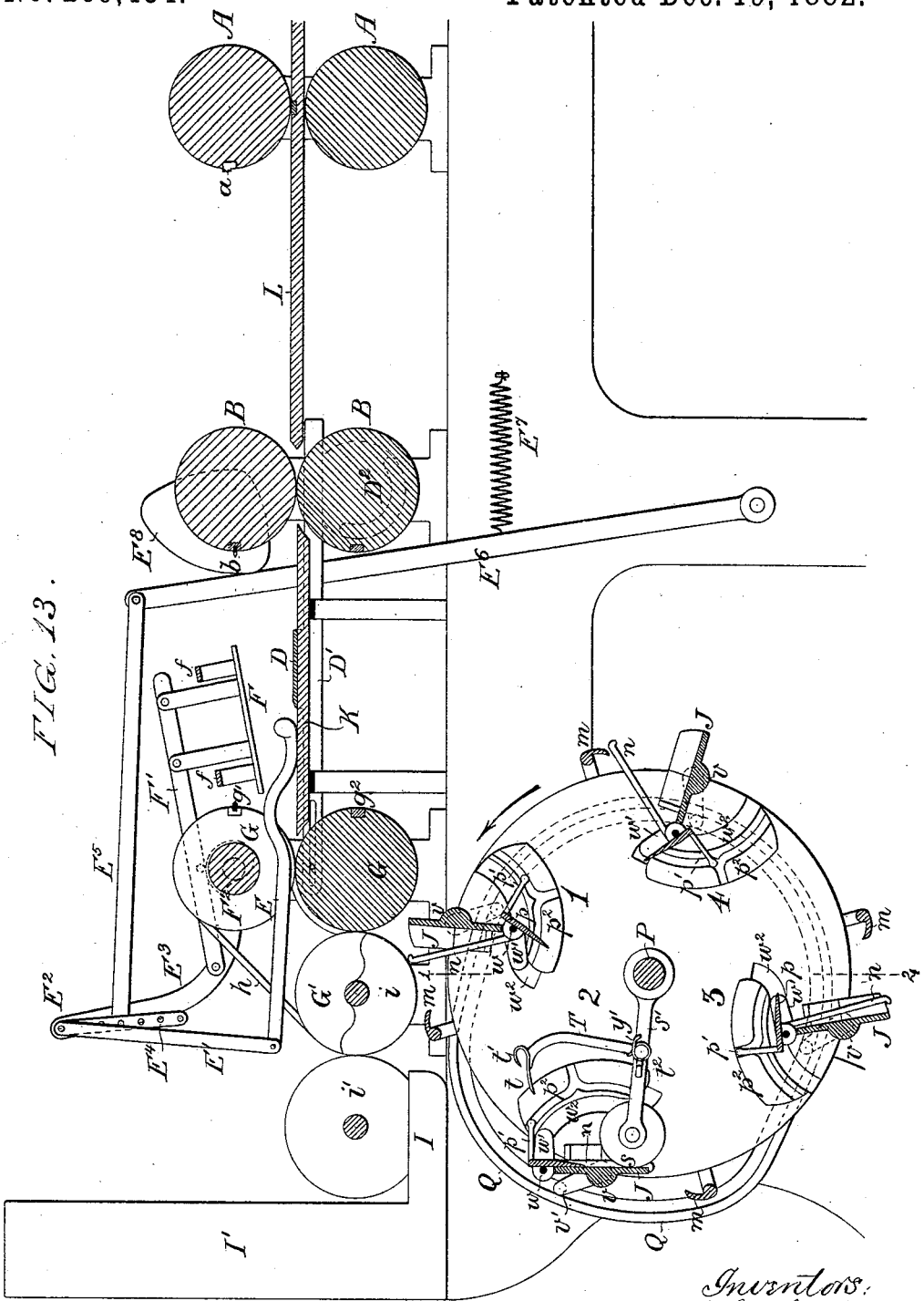

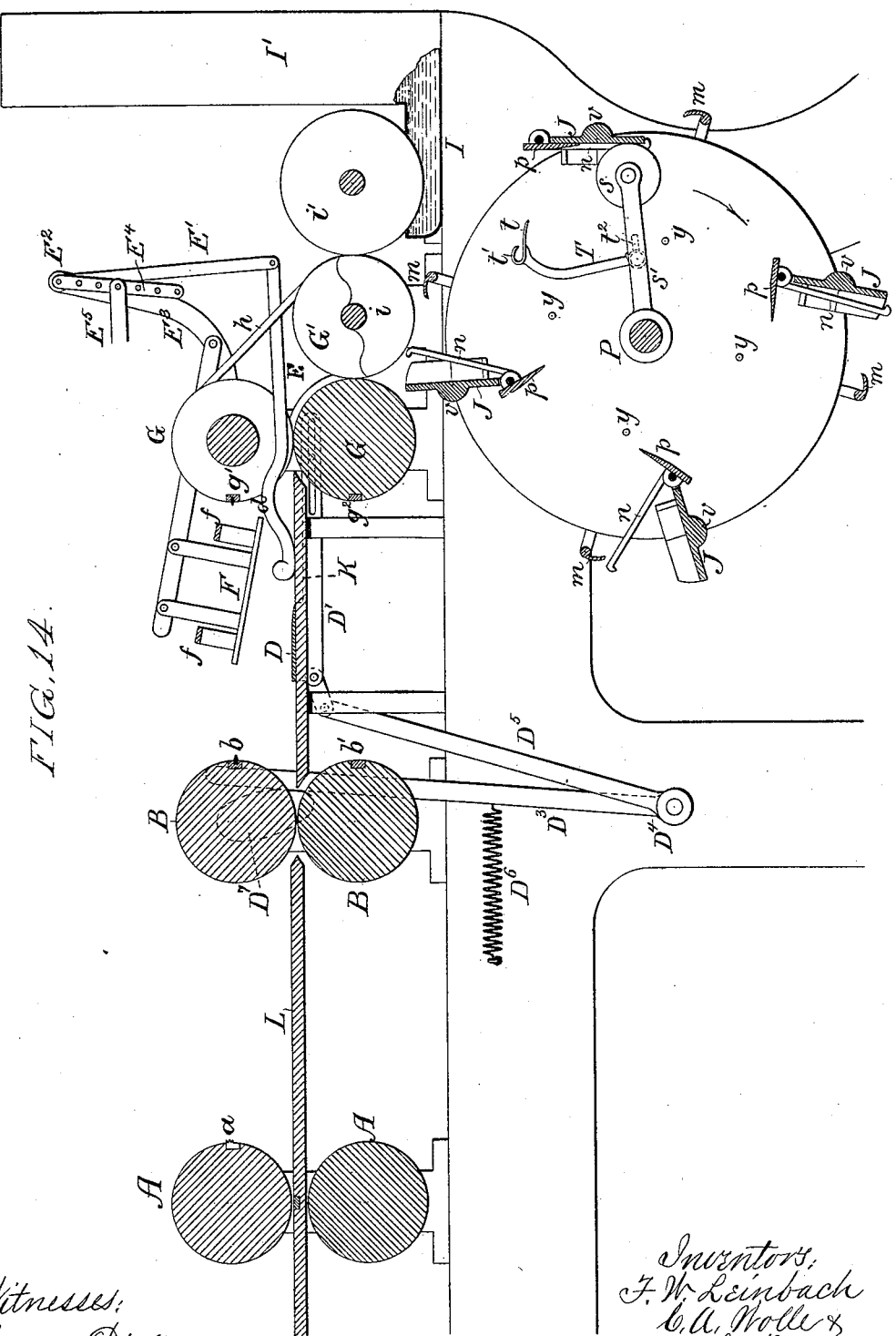

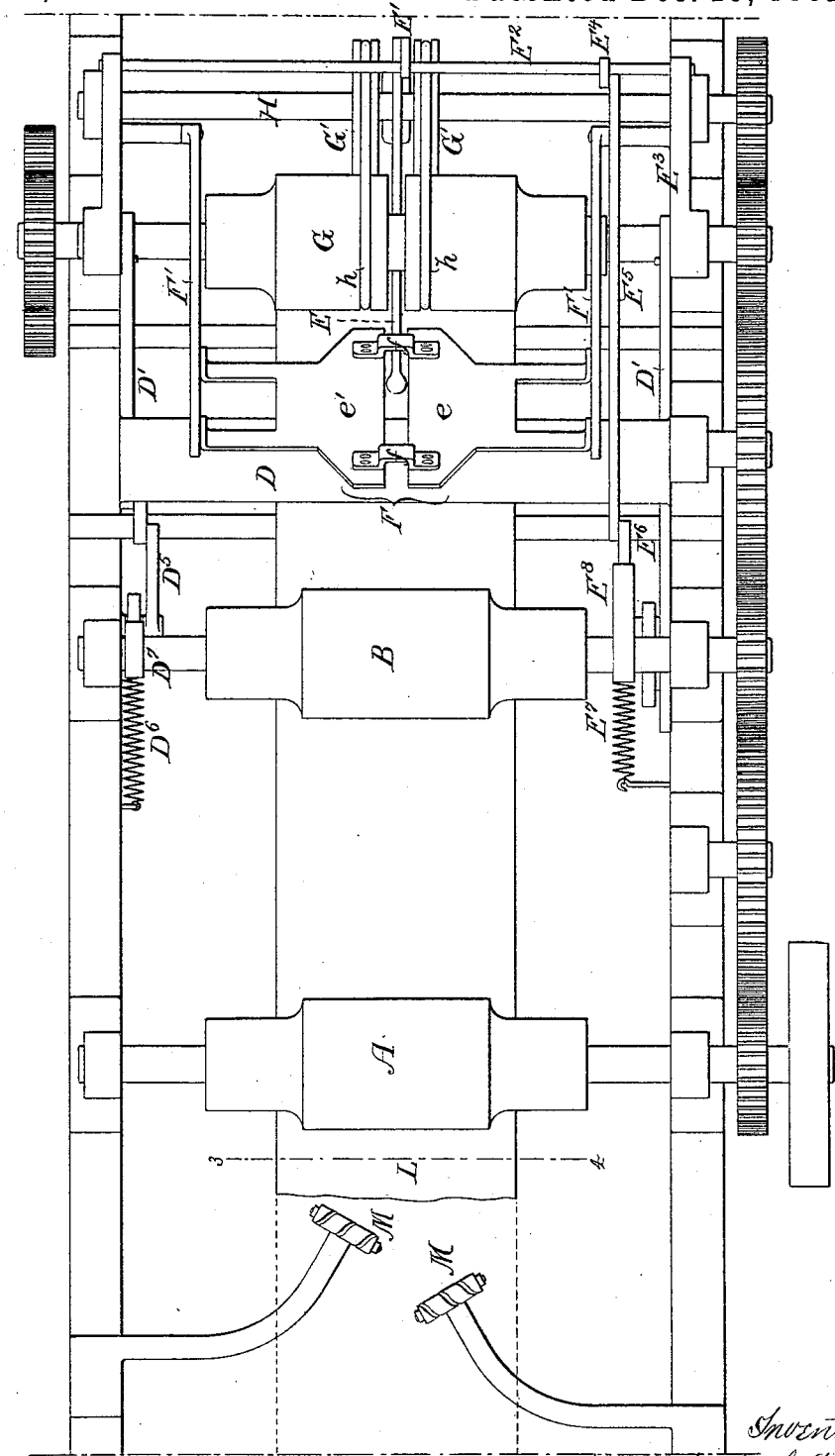

(No Model.) 6 Sheets—Sheet 6.
F. W. LEINBACH, C. A. WOLLE & E. H. BRUNNER.
PAPER BAG MACHINE.
No. 269,434. Patented Dec. 19, 1882.

UNITED STATES PATENT OFFICE.

FELIX W. LEINBACH, CLARENCE A. WOLLE, AND EDWARD H. BRUNNER, OF BETHLEHEM, PENNSYLVANIA, ASSIGNORS TO SAID WOLLE.

PAPER-BAG MACHINE.

SPECIFICATION forming part of Letters Patent No. 269,434, dated December 19, 1882.

Application filed November 14, 1881. (No model.)

*To all whom it may concern:*

Be it known that we, FELIX W. LEINBACH, CLARENCE A. WOLLE, and EDWARD H. BRUNNER, citizens of the United States, residing in Bethlehem, Northampton county, Pennsylvania, have invented certain Improvements in Paper-Bag Machines, of which the following is a specification.

Our invention relates to certain improvements in the machine for making paper bags for which Letters Patent of the United States No. 218,036 were granted to our assignees July 29, 1879, our present improvements relating to details of the tube-forming devices, and devices for forming the primary fold in the bag-bottom, and for pasting the flaps and completing the bottom, all as fully set forth hereinafter.

Figure 16:
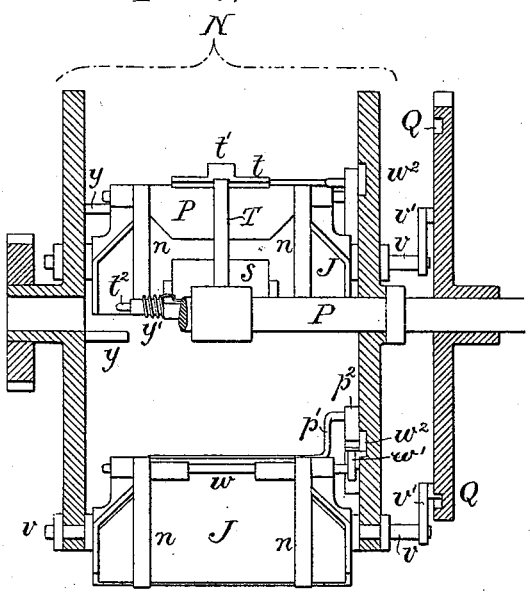
Figure 17:
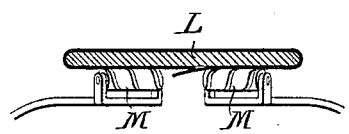

In the accompanying drawings, Figures 1 to 12, inclusive, Sheets 1 and 2, are diagrams illustrating the successive steps in the formation of the bag. Fig. 13, Sheet 3, is a longitudinal section of part of the machine, whereby the operations shown in Figs. 1 to 12 are performed. Fig. 14, Sheet 4, is a longitudinal section of the machine, looking in the opposite direction from Fig. 13. Fig. 15, Sheet 5, is a plan view of part of the machine; Fig. 16, Sheet 6, a transverse section on the line 1 2, Fig. 13; and Fig. 17, a transverse section on the line 3 4, Fig. 15.

Before proceeding to describe the detailed construction of the machine we will describe the various steps in the formation of the bag, and those parts of the machine only which act directly upon the bag, reference being had to Figs. 1 to 12 of the drawings.

Figure 1:
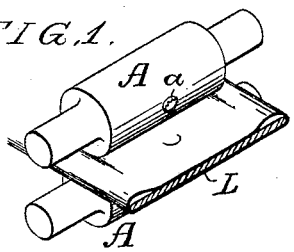
Figure 2:
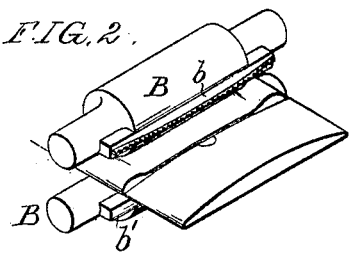

The tube of paper passes first between a pair of rollers, A A, Fig. 1, one of which is furnished with a segmental knife, $a$, for cutting a thumb-notch in the tube, as in our former patent. The tube then passes between rolls B B, Fig. 2, one of which carries a knife, $b$, the other roll being furnished with a strip, $b'$, of rubber or other yielding material, which acts in conjunction with the knife, whereby the tube is severed into short lengths, each of the proper size for the bag to be produced. A slot may replace the elastic strip, if desired. It will be observed that the knife $b$ is curved, so that the tube is severed on a curved line, for a purpose set forth in our Patent No. 242,662, dated June 7, 1881.

Figures 3, 4:
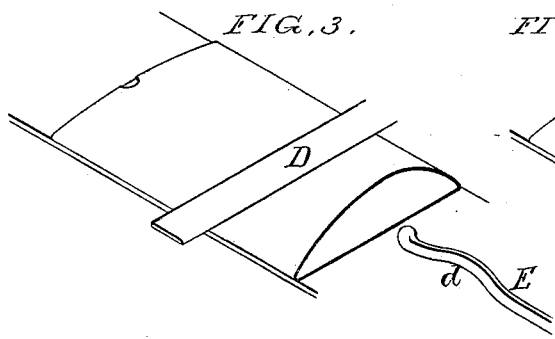

The rolls A and B are reduced in diameter at and near each end, so that the opposite edges of the tube are not subjected to pressure, but are allowed to preserve the rounded or distended shape given to them by the former over which the tube is made, and as the tube continues to move forward it is subjected to the action of a transverse presser-plate, D, and longitudinally-reciprocating distending-rod E, Fig. 3, the plate D acting on the tube some distance in the rear of the severed end of the same, and, owing to the unbroken edges of the tube, causing the mouth of the said tube to open for the entrance of the distending-rod E, which folds back the upper half of the tube over the plate D, thus forming the primary or diamond-shaped fold in the bag-bottom, as set forth in our Patent No. 218,036, before alluded to. (See Fig. 4.)

Figure 5:
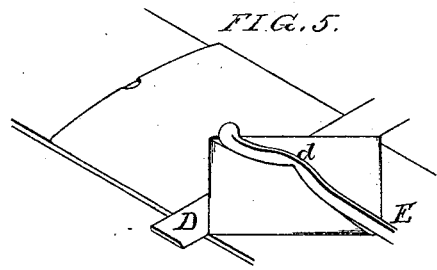
Figure 6:
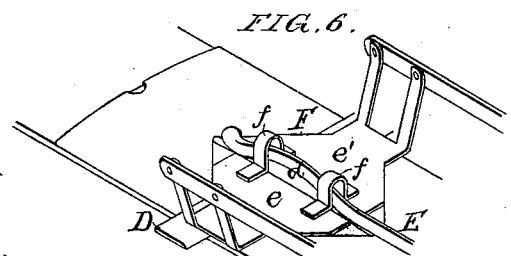
Figure 8:
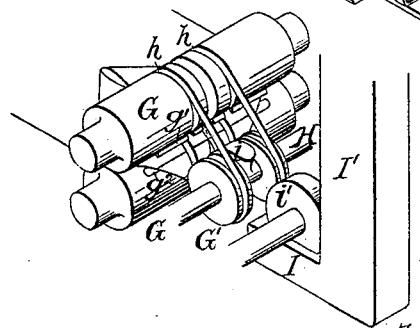
Figure 7:
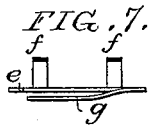
Figure 9:
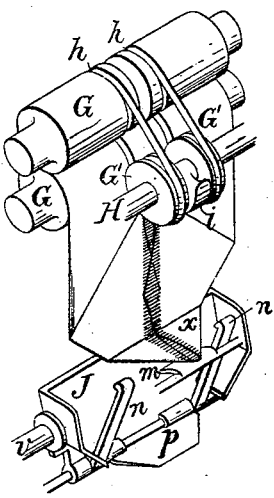
Figure 10:
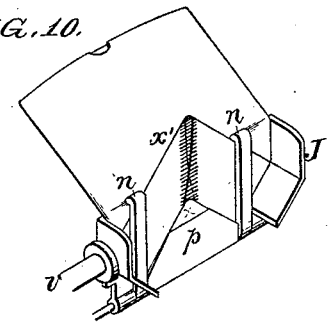
Figure 12:
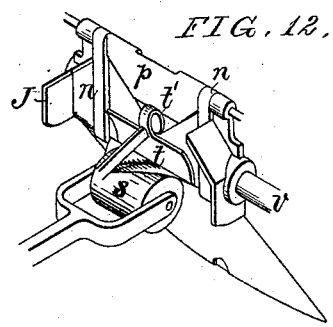
Figure 11:
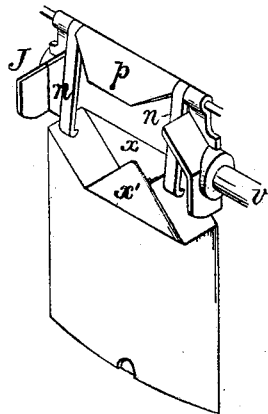

The severing of the tube on a curved line, as above set forth, causes the point of one of the flaps of the primary fold to overlap the point of the other flap, and in order to permit this overlapping of the flaps the distending-rod E is arched at $d$, so that the points of the flaps are at liberty to pass beneath the same, as in Fig. 5. Instead of being arched, as shown, the rod E might be recessed on the under side for the same purpose. After the primary fold is made it is flattened by the action of an oscillating plate, F, comprising the opposite halves, $e\ e'$, arranged one on each side of the distending-rod E, and connected by arched bridge-pieces $f\!f$, under which said rod works. (See Fig. 6.) One of the halves, $e$, of the plate F carries a spring-finger, $g$, Fig. 7, which projects below the plate, and as the latter descends this finger commences to act upon one flap of the fold before the other half of the plate commences to act upon the other flap, so that one flap is flattened down in advance of the other, and the proper overlapping of the points of the flaps is insured. In the absence of the spring-finger $g$ there might be a tendency in some cases for the points of the flaps to meet in the center, and thus interfere with the proper formation of the primary fold. The bag-blank now passes between a pair of rollers, G G, Fig. 8, and has a transverse crease formed therein to determine the line of the second fold or flap, $x$, this crease being formed by the joint action of a blade, $g'$, on the upper roll G and an elastic strip, $g^2$, on the lower roll. The blank is then brought under the control of a pair of belts, $h$, which pass around the upper roll G and round a pair of pulleys, G', carried by a shaft, H, and arranged adjacent to the lower roll G, around which the blank is bent by the action of the belts, as shown in Fig. 8, so that it is discharged vertically downward as soon as it is free from the control of the belts. While the primary fold is passing around the lower roller G paste is applied to the central portion of the same by a segmental block, $i$, carried by the shaft H and located between the pulleys G', this block receiving paste from a roller, $i'$, which rotates in a paste-trough, I, forming part of a reservoir, I', the latter extending above the trough and being closed at the top. By this means a supply of paste at a uniform level is maintained in the paste-trough, a fresh supply of paste entering the latter from the reservoir as soon as the level of paste in the trough has been lowered to such an extent as to permit the entrance of air to the lower end of the reservoir, the flow ceasing as soon as the air-inlet is closed. As the bag-blank passes from under the control of the belts $h$ it falls into a holder, J, the point of the flap $x$ being turned up by contact with a plate, $m$, as the blank falls into the holder. (See Fig. 9.) As soon as the blank reaches its position in the holder J it is clamped therein by a pair of arms, $n$, and the flap $x$ is pressed down by means of a plate, $p$, as shown in Fig. 10. The holder J is then reversed, as shown in Fig. 11, and the flap $x'$ is brought into contact with a roller, $s$, whereby it is turned up, the extent of the flap being limited by the clamping-arms $n$, and a blade, $t$, being thrust into the fold as the flap is being turned up, so as to properly crease the same, the blade being withdrawn before the folding up of the flap is completed. The upper ends of the arms $n$ are hooked, as shown in Figs. 9 and 10, so as to bend the body of the bag backward over the upper edge of the holder J, and thus cause the projection of the flap $x'$, so as to insure the proper action of the roller $s$ thereon. The blade $t$ carries a finger, $t'$, which, as the blade is thrust into the folds of the flap $x'$, acts upon the point of the flap $x$ and presses the same down against the bottom of the bag, so as to securely fasten the flap. (See Fig. 12.) When the pressing of the flap $x'$ has been completed the clamping-arms $n$ and presser-plate $p$ are moved outward, so as to release the finished bag, which falls into any convenient receptacle or onto a carrying-belt, which conveys it to a suitable drier.

The necessary parts of the machine employed in carrying out the above-described operations are shown in Figs. 13 to 17, inclusive, and will now be described.

The journals of the various rollers are adapted to bearings on the opposite side frames of the machine, and are geared together by spur-gears, as shown in Fig. 15.

The drawing-rolls G G should be of slightly larger diameter than the rolls B, which carry the severing devices; or the gearing should be such as to impart a slightly greater speed to the rolls G than to the rolls B, so that as soon as a bag-blank is severed from the tube it will be drawn gradually away from the cut end of the same, and will not interfere with the opening of the said end when pressure is exerted upon the tube by the plate D.

We use in the present machine a pressing-table, K, and a plate, L, around which the tube is formed, the joint being on the under side of the tube, as in our former patented machine.

On the under side of the plate L are arranged a pair of rollers, M, set obliquely to the direction of movement of the tube, so that as the latter is drawn forward the rollers will have a tendency to draw the edges of the tube inward, so as to tighten the same and cause the pasted edge to overlap the opposite edge, so that the proper joint will be made when the tube passes between the rollers A.

The presser-plate D is carried by bars D', slotted at the rear ends for adaptation to pins on the frame. Vertical movement is imparted to the plate D by a cam, $D^2$, on the shaft of the lower roller B, (see dotted lines, Fig. 13,) acting on one of the bars D', and longitudinal movement is imparted to the plate by means of a cam, $D^7$, on the shaft of the upper roll B, Fig. 14, said cam acting on an arm, $D^3$, on a rock-shaft, $D^4$, which carries an arm, $D^5$, connected by a link to one of the arms D'. A spring, $D^6$, effects the retraction of the arm $D^3$.

The distending-rod E is connected to an arm, E', on a rock-shaft, $E^2$, hung to brackets $E^3$ on the frame, another arm, $E^4$, on said shaft being connected by a rod, $E^5$, to an arm, $E^6$, which is acted upon by a spring, $E^7$, and by a cam, $E^8$, on the shaft of the upper roll B.

The presser-plate F is carried by a pair of arms, F', hung to the brackets $E^3$, one of said arms being acted upon by a cam, $F^2$, on the shaft of the upper roller G, so as to impart the proper oscillating movement to the presser-plate F.

A series of bag-holders, J—four in the present instance—are carried by a drum or cylinder, N, comprising two opposite disks adapted to turn on a central shaft, P, and having at equidistant points around the periphery bearings for the shafts $v$, which carry said bag-holders, each shaft having an arm, $v'$, the end of which carries a pin adapted to a slotted cam, Q, on the side frame of the machine. The movements of the holders J cause the automatic operation of the plates $p$ and clamping-arms $n$, the plates $p$ being hung upon and the arms $n$ secured to rock-shafts $w$ at the inner edges of the holders J. (See Fig. 13.)

Each rock-shaft has an arm, $w'$, a pin on which is adapted to a cam-slot, $w^2$, in one of the disks of the cylinder or drum N, and each plate $p$ has an arm, $p'$, a pin on which is adapted to a cam-slot in a plate, $p^2$, secured to said disk. The cams Q, $w^2$, and $p^2$ are such that as the cylinder N is revolved in the direction of the arrow, Fig. 13, the bag-holders J and their clamping-arms $n$ and presser-plates $p$ are operated as follows: In passing beneath the rollers G G' the parts are in the position 1, Fig. 13, the upper ends of the clamping-arms $n$ being adjacent to the rolls and separated from the holder J sufficiently to allow the bag to drop into the latter, the presser-plate $p$ also being retracted, as shown. As the cylinder rotates the holder is reversed by the action of the cam Q on the arm $v'$, and this movement causes the cams $w^2$ and $p^2$ to operate on the arms $w'$ and $p'$ and fold the arms $n$ and plate $p$ against the holder J, the parts being then in the position 2, and remaining in this position as the holder passes the pressing-roller $s$, and the folding of the bottom of the bag is completed. As soon as the bag-holder is free from the roller $s$ said holder commences to resume its original position, and this causes the opening of the arms $n$ and plate $p$, so as to permit the discharge of the finished bag from the holder when the parts reach the position 3. The arms $n$ and plate $p$ are still farther opened when they reach the position 4, and are then restored to their original position, as at 1, preparatory to receiving another bag from the rolls G G'.

The roller $s$ is carried by a fixed arm, $s'$, on the central shaft, P, of the cylinder N, and to said arm is hung a lever, T, the long arm of which carries the creasing-blade $t$ and pressing-finger $t'$, the short arm of the lever having a pin, $t^2$, which is acted upon, as the cylinder N revolves, by pins $y$ on one of the disks of said cylinder, whereby the vibration of the lever at the proper times is effected, the restoration of the lever to its original position, when released from the control of the pins $y$, being effected by a spring, $y'$. (See Figs. 13 and 16.)

The plates $m$, which effect the preliminary folding of the flap $x$ of the bag-bottom, are carried by the cylinder N, occupying positions somewhat in advance of the bag-holders, as shown in Figs. 13 and 14.

The cylinder N may carry as many bag-holders, with their clamps and pressers, as desired, the speed of the cylinder in respect to the other parts of the machine being governed by the number of holders carried thereby, so that, although the machine may be run at a very high rate of speed, ample time is given for the proper folding and securing of the finishing-folds $x\ x'$ of the bag-bottom.

We claim as our invention—

1. The combination of rolls for feeding a tube without flattening its edges, a curved cutting-blade for severing the tube on a curved line, a transverse presser-blade, and a longitudinally-reciprocating distending rod, arched or recessed, as set forth.

2. The combination of the rolls for feeding a tube without flattening the edges, a transverse presser-blade, a longitudinally-reciprocating distending-rod, and an oscillating presser-plate F, whereby the primary fold is flattened, as set forth.

3. The combination of the rolls for feeding the tube without flattening the edges, a transverse presser-blade, a longitudinally-reciprocating distending-rod, and an oscillating presser-plate, F, having a spring-finger, $g$, as set forth.

4. The combination of the rolls G G, the pulleys G', the belts $h$, and the pasting-block $i$, whereby paste is applied to the bag-bottom as the latter is carried round the lower roll G, as set forth.

5. The combination, in a paper-bag machine, of a holder, J, adapted to receive a partly-folded bag-blank, with a presser-plate, $p$, whereby the flap $x$ of the bag is folded, as set forth.

6. The combination, in a paper-bag machine, of rolls for feeding a partly-folded bag-blank, a plate, $m$, adapted to act upon the flap $x$ of the bag to commence the folding of the latter, a holder, J, and a presser-plate, whereby the folding of the flap $x$ is completed, as set forth.

7. The combination, in a paper-bag machine, of a holder, J, adapted to receive a partly-folded bag-blank, with a presser-plate, $p$, and clamping-arms $n$, as set forth.

8. The combination of the holder J with the clamping-arms $n$, having hooked ends, as set forth.

9. The combination, in a paper-bag machine, of a holder, J, adapted to receive a partly-folded bag-blank, and pivoted so as to be capable of reversal, with a presser, $p$, for the fold $x$ of the bag-bottom, and a presser, $s$, for the final fold $x'$ of the same, as set forth.

10. The combination of the holder J with the clamps $n$ and presser $p$, the presser $s$, and the creasing-blade $t$, as set forth.

11. The combination of the holder J with the clamps $n$ and presser $p$, the presser $s$, and the creasing-blade $t$, with finger $t'$, as set forth.

12. The combination, in a paper-bag machine, of a cylinder, N, with a series of bag-holders, J, and a series of clamps and pressers carried by said cylinder N, all substantially as set forth.

13. The combination of the rotating cylinder N, a bag-holder, J, pivoted thereto, and a cam, Q, adapted to actuate said bag-holder, as set forth.

14. The combination of the rotating cylinder, a reversible bag-holder, J, carried thereby, the clamps $n$ and their rock-shaft $w$, and a cam, $w^2$, adapted to actuate said rock-shaft as the holder is reversed, as set forth.

15. The combination of the cylinder N, the reversible bag-holder J, carried thereby, the presser-plate $p$ and its arm $p'$, and the cam $p^2$, adapted to actuate the presser-plate as the holder is reversed, as set forth.

In testimony whereof we have signed our names to this specification in the presence of two subscribing witnesses.

FELIX W. LEINBACH.
CLARENCE A. WOLLE.
EDWARD H. BRUNNER.

Witnesses:
  FR. M. RAUCH,
  SAML. KRAUSE.